US007462004B2

(12) United States Patent
Kopp

(10) Patent No.: US 7,462,004 B2
(45) Date of Patent: Dec. 9, 2008

(54) DRILL FIXTURE

(75) Inventor: James Kenneth Kopp, Big Stone Gap, VA (US)

(73) Assignee: Smart Tools Inc., Coeburn, VA (US)

( * ) Notice: Subject to any disclaimer, the term of this patent is extended or adjusted under 35 U.S.C. 154(b) by 378 days.

(21) Appl. No.: 11/261,878

(22) Filed: Oct. 28, 2005

(65) Prior Publication Data

US 2006/0263155 A1 Nov. 23, 2006

Related U.S. Application Data

(63) Continuation-in-part of application No. 11/132,847, filed on May 19, 2005, now abandoned.

(51) Int. Cl.
*B23B 45/14* (2006.01)

(52) U.S. Cl. ......................... 408/137; 408/99; 408/102; 408/138

(58) Field of Classification Search ................... 408/87, 408/99, 102, 111, 129, 137, 138; *B23B 45/14*
See application file for complete search history.

(56) References Cited

U.S. PATENT DOCUMENTS 28,327 A * 5/1860 Parker ........................ 408/121
28,328 A * 5/1860 Parker ........................ 408/121
42,560 A * 5/1864 Chapman .................... 408/121
79,115 A * 6/1868 Hainque ..................... 408/121
130,645 A * 8/1872 Lavery ....................... 408/121
142,356 A * 9/1873 Sloan ......................... 408/121
212,066 A * 2/1879 Steber ........................ 408/121
292,345 A * 1/1884 Moritz ....................... 408/121
292,522 A * 1/1884 Whitney ..................... 408/121
295,694 A * 3/1884 Vinton ........................ 408/121
337,599 A * 3/1886 Magnette .................... 408/121
354,085 A * 12/1886 Baker ......................... 408/129
365,587 A * 6/1887 Davy .......................... 408/121
369,120 A * 8/1887 Moffet ....................... 173/145
378,944 A * 3/1888 Vinton ........................ 408/121
439,567 A * 10/1890 Schoff ........................ 408/137
444,256 A * 1/1891 Smith ......................... 408/121
446,073 A * 2/1891 Myers ........................ 408/121
497,261 A * 5/1893 Anderson ................... 408/121
506,954 A * 10/1893 Timolat et al. ................ 74/413

(Continued)

*Primary Examiner*—David P Bryant
*Assistant Examiner*—Eric A Gates
(74) *Attorney, Agent, or Firm*—Lawrence E. Laubscher, Jr.

(57) ABSTRACT

A drill fixture enabling drilling through hard objects in a confined area includes a housing, a threaded rod connected with the housing, and a tubular adjustment sleeve rotatably connected with the rod. A drill is arranged in the housing and has a drill bit extending in a forward direction. The sleeve is rotated relative the threaded rod for displacement along the length of the rod until the sleeve engages a fixed surface opposite the object to be drilled. With the sleeve rear portion engaging the fixed surface, further rotation of the sleeve displaces the housing in a forward direction during rotation of the drill bit so that the bit bores through the hard object until a hole is formed. Rotation of the sleeve in the opposite direction causes the drill bit to be retracted from the object. In lieu of a rotatable sleeve, a piston may be provided which is extended and retracted relative to the housing to provide a linear drilling force to the drill bit relative to a fixed surface.

12 Claims, 6 Drawing Sheets

U.S. PATENT DOCUMENTS

| | | | | | |
|---|---|---|---|---|---|
| 620,461 | A | * | 2/1899 | Lambkin | 408/121 |
| 644,753 | A | * | 3/1900 | Allen | 91/173 |
| 663,887 | A | * | 12/1900 | Halsey | 408/121 |
| 666,695 | A | * | 1/1901 | Renshaw | 408/129 |
| 784,301 | A | * | 3/1905 | Carll | 408/79 |
| 941,916 | A | * | 11/1909 | Figg | 408/121 |
| 944,955 | A | * | 12/1909 | Derrick et al. | 408/121 |
| 966,751 | A | | 8/1910 | Jacobs | |
| 971,755 | A | * | 10/1910 | Johnsen | 408/121 |
| 1,065,163 | A | * | 6/1913 | Miller | 408/121 |
| 1,084,324 | A | * | 1/1914 | Foley | 408/121 |
| 1,130,770 | A | * | 3/1915 | Smedstad | 408/111 |
| 1,132,113 | A | * | 3/1915 | Olson | 408/137 |
| 1,138,276 | A | * | 5/1915 | Carll | 408/121 |
| 1,243,100 | A | * | 10/1917 | Prosser | 408/137 |
| 1,265,630 | A | * | 5/1918 | Donohue | 408/121 |
| 1,434,946 | A | * | 11/1922 | Fiorillo | 408/111 |
| 1,607,584 | A | * | 11/1926 | Bennett | 384/91 |
| 1,705,232 | A | * | 3/1929 | Brantingson | 173/141 |
| 1,705,384 | A | * | 3/1929 | Wikander | 408/137 |
| 2,376,524 | A | | 5/1945 | Talboys et al. | |
| 2,405,110 | A | * | 8/1946 | Bullock | 173/141 |
| 2,627,295 | A | * | 2/1953 | Jackson | 72/302 |
| 2,643,088 | A | * | 6/1953 | Hornack | 173/152 |
| 2,683,375 | A | * | 7/1954 | Gerentes | 74/22 R |
| 2,947,204 | A | * | 8/1960 | Pine et al. | 173/141 |
| 2,973,673 | A | * | 3/1961 | Grau | 408/99 |
| 4,484,844 | A | | 11/1984 | Williams | |
| 4,818,155 | A | * | 4/1989 | Belknap | 408/130 |
| 4,870,730 | A | * | 10/1989 | Belknap | 29/26 A |
| 5,322,397 | A | | 6/1994 | Spear | |
| 5,676,503 | A | * | 10/1997 | Lang | 408/234 |
| 6,095,724 | A | * | 8/2000 | Hurt | 408/136 |
| 2005/0276670 | A1 | * | 12/2005 | Freund | 408/129 |

* cited by examiner

DRILL FIXTURE

This application is a continuation-in-part of application Ser. No. 11/132,847 filed May 19, 2005, now abandoned.

BACKGROUND OF THE INVENTION

When it is necessary to drill through hard surfaces, it is often difficult to apply sufficient force to the drill in the drilling direction so that the drill bit can bore through the surface. For example, in the repair of large vehicles such as trucks, it is often necessary to drill through the metal truck frame. Because access to the frame is limited, it is difficult to position the drill and apply sufficient force to the drill during the drilling operation. The present invention relates to a drill fixture which holds and advances the drill toward the surface to be drilled.

BRIEF DESCRIPTION OF THE PRIOR ART

Drill fixtures are well-known in the patented prior art as evidenced by the Pine U.S. Pat. No. 2,947,204 which discloses a universal power tool holder in which an inner telescoping member slides vertically within a sleeve and is fixed relative to the sleeve by a clamp screw. A compression spring biases the inner member upwardly as a drilling operation is performed.

While the prior devices operate satisfactorily, they do not provide adequate control of displacement of the drill toward the surface to be drilled. Moreover, they are cumbersome to assemble and operate, and thus are not suitable for use in tight environments with limited access to the drilling site. The present invention was developed in order to overcome these and other drawbacks of prior drill fixtures by providing a fixture that is manually operable to support and displace a drill toward a surface to be drilled such as a truck frame.

SUMMARY OF THE INVENTION

The drill fixture includes a housing having a forward portion for receiving a drill and a coaxial rearwardly extending cylindrical section. An abutment member is arranged within and coaxial with the housing cylindrical section and a mechanism is provided for extending and retracting the abutment member relative to the housing cylindrical section. When the drill is positioned adjacent to a hard surface and the abutment member is positioned against a rear surface, the abutment member may be extended from the cylindrical section while the drill is operated to provide a longitudinal drilling force along the axis of the housing.

In one embodiment, a threaded rod is connected with the housing and extends from the cylindrical section and the abutment member is threadably connected with the rod for displacement along the rod upon rotation of the sleeve to extend and retract the abutment member.

In an alternate embodiment, a piston serves as the actuator member and a pneumatic actuator is provided to extend and retract the piston relative to the housing.

The drill fixture is particularly adapted for use in drilling holes in surfaces which are difficult to access such as a vehicle frame. In such an environment, an opposite portion of the vehicle frame may serve as the rear surface. If a rear surface is not readily available, a mounting bracket is provided for connection with the vehicle and has a surface parallel to and opposite a surface of the vehicle frame to be drilled.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
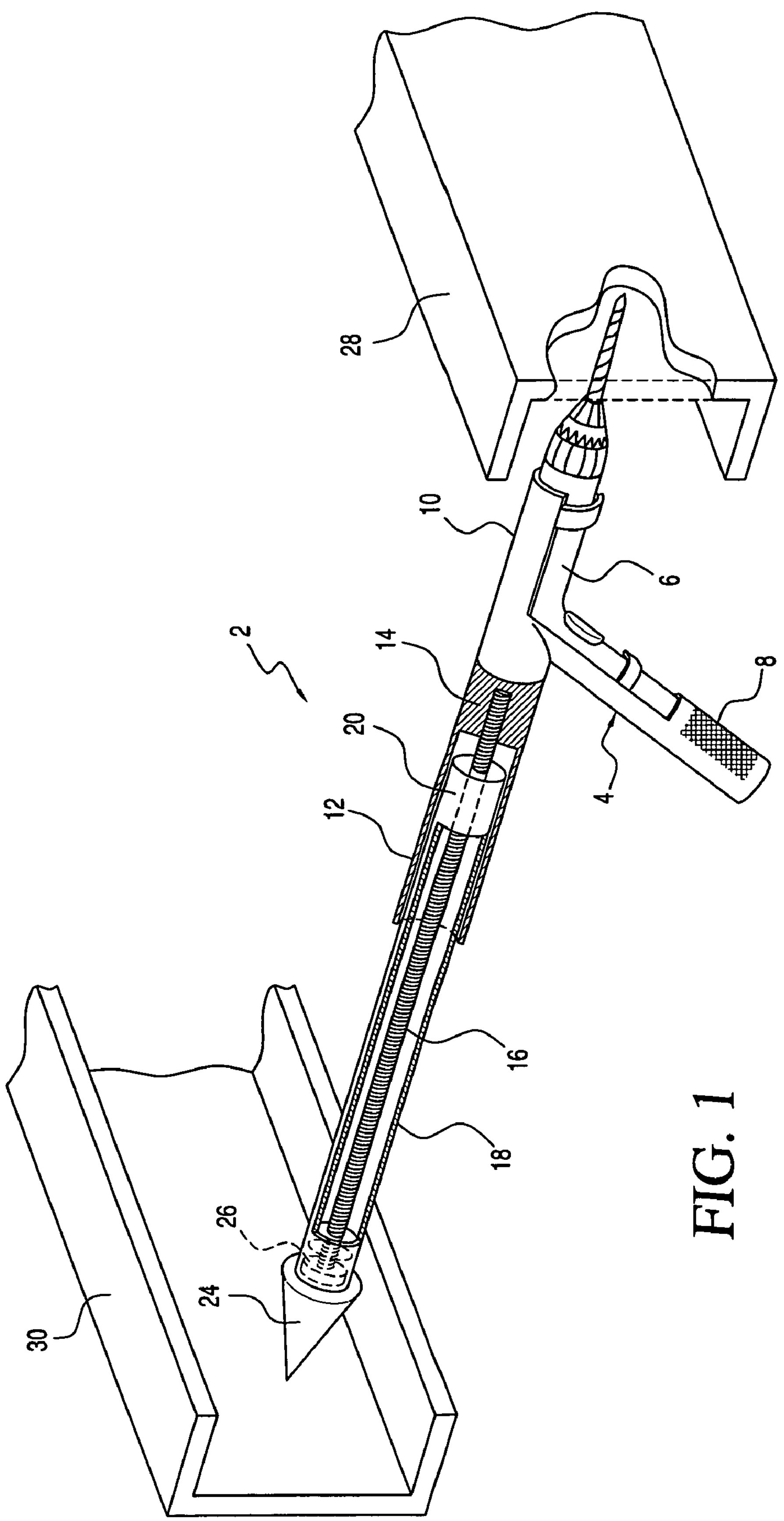
FIG. 1 is a perspective view of the drill fixture according to the invention.

Referring first to FIG. 1, the drill fixture 2 according to a preferred embodiment will be described. The fixture includes a housing 4 configured to receive a power drill 6. It will be readily apparent that differently configured housings may be provided for receiving differently configured drills. In each configuration, the housing includes a handle 8, a forward portion 10 from which the drill bit portion of the drill 6 protrudes, and a rearwardly extending cylindrical section 12.

Figure 2:
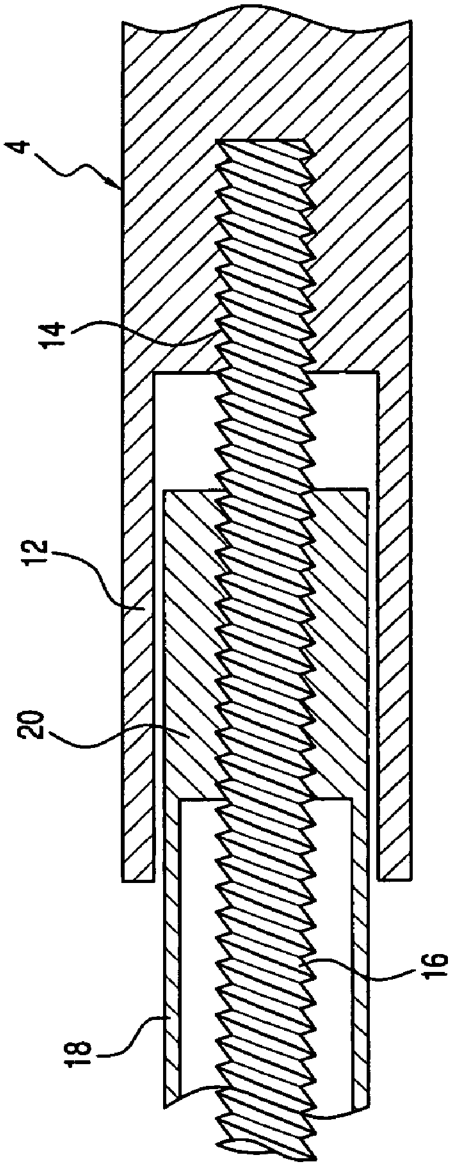
FIG. 2 is a partial sectional view of the connection between the housing, the threaded rod and the cylindrical sleeve according to the invention.

As shown in detail in FIG. 2, the housing contains a threaded opening 14 for receiving a threaded rod 16. In a preferred embodiment, the rod is fixed relative to the housing. The rod extends rearwardly from the housing and extends beyond the end of the rearwardly extending cylindrical portion 12 of the housing as shown in FIG. 1. A cylindrical or tubular sleeve 18 is threadably connected with the threaded rod 16 for displacement along the length of the rod. The sleeve includes a forward internally threaded portion 20 (FIG. 2) connected with the rod 16 as well as a rearward internally threaded portion 22 (FIG. 3) which is also connected with the rod. Alternatively, the entire inner surface of the sleeve may be threaded for connection with the rod.

Rotation of the sleeve in a first direction displaces the sleeve along the rod in a direction away from the housing and rotation of the sleeve in an opposite direction displaces the sleeve in a direction toward the housing. As will be developed in greater detail below, the sleeve is preferably rotated manually by the operator. The threads of the rod are angled so that ten rotations of the sleeve result in one inch of travel of the sleeve. Other angles of the threads may be provided to alter the degree of displacement of the sleeve per rotation.

Figure 3:
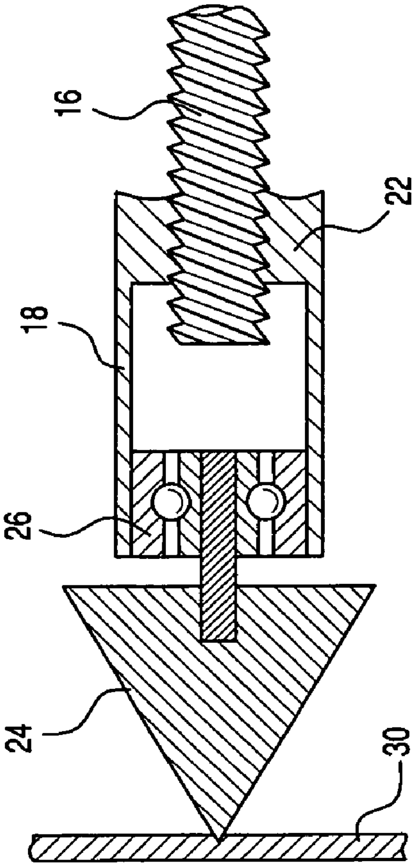
FIG. 3 is a partial sectional view of the connection between the cylindrical sleeve and the abutment device according to the invention.

At the free end of the sleeve 18, an abutment device 24 is provided. Preferably, the abutment device is connected with the sleeve via a bearing 26 which allows free rotation of the abutment device relative to the sleeve. The preferred configuration of the abutment device is a cone as shown in FIG. 3, with the point of the cone being aligned with the axis of the threaded rod which in turn is aligned with the axis of the drill bit.

Referring once again to FIG. 1, the operation of the drill fixture 2 according to the invention will be described. By way of example only, the description will be in connection with drilling a hole in a metal truck frame or rail 28. It will be appreciated by those skilled in the art that the invention is also suitable for drilling through any hard objects made of plastic, wood, or other rigid material. Although not absolutely necessary, a drilling location is marked by a punch to place an indentation into the truck frame. Similarly, an indentation is punched into a fixed surface opposite the drilling location. In the example shown, the fixed surface is an opposed rail 30 of the truck frame.

The drill fixture is arranged between the truck rails 28 and 30 with the drill bit engaging the indentation in the rail 28 and the pointed end of the conical abutment device engaging the indentation in the rail 30. The sleeve is rotated as necessary to displace the sleeve until the abutment device and the drill bit engage their respective indentations. The operator grasps the handle 8 of the housing 4 with one hand and the sleeve 18 with the other. As the drill is engaged to rotate the drill bit, the operator rotates the sleeve in the first direction to displace the sleeve away from the housing. Because the abutment device engages the opposite rail 30, the net effect is that the housing is displaced toward the rail so that the drill bit is forced through the rail to drill an opening therein. For ten pounds of rotational force on the sleeve, approximately 800 pounds of pressure are applied to the drill bit. Because of the alignment of the abutment device, the threaded rod, and the drill bit, breakage of the bit due to an off-center application of force is avoided.

Once the hole in the rail has been completed, the sleeve is rotated in the opposite direction so that it is displaced along the rod in a direction toward the housing. This enables the drill bit to be withdrawn from the hole and the entire fixture re-positioned to the location of the next hole to be drilled.

While the invention has been described with a rear abutment device, it will be appreciated that the fixture will also work without the abutment device. That is, the rear edge of the cylindrical sleeve 18 may serve as the abutment device and the fixture will operate in the same manner as described above to drill a hole in an object or hard surface.

Figure 4:
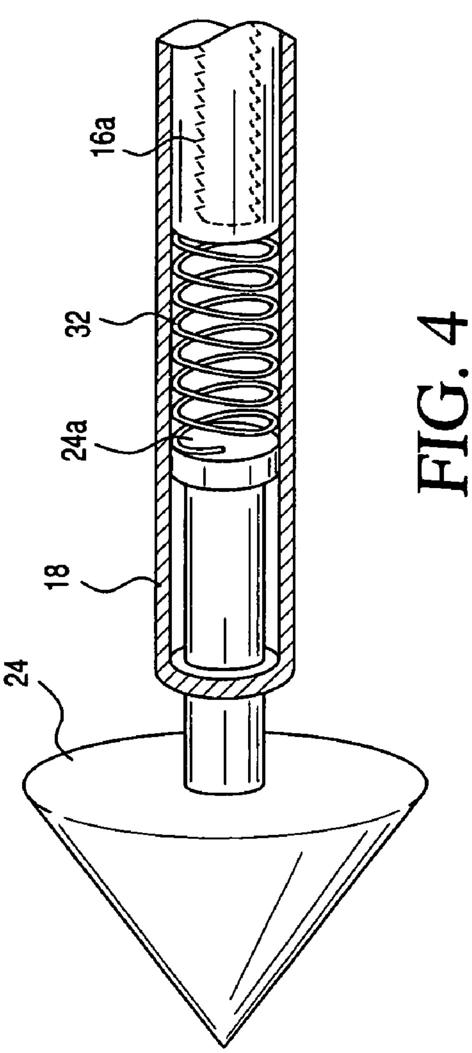
FIGS. 4 and 5 are partial sectional views, respectively, of alternate embodiments of the connection between the cylindrical sleeve and the abutment device according to the invention.
Figure 5:
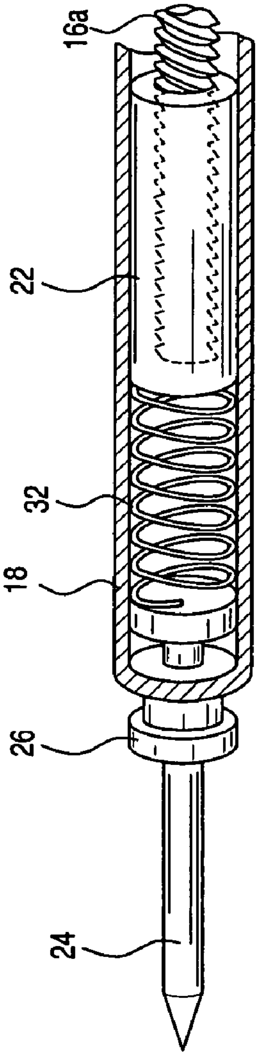

Referring now to FIGS. 4 and 5, a further embodiment of the invention will be described. As shown therein, a spring 32 is provided between an inner end 24*a* of the abutment device 24 and between the rear end 16*a* of the threaded rod. The spring 32 biases the abutment device in a rearward direction with sufficient force to enable the fixture to be suspended between the truck rails 28, 30 without support of the operator. This enables the operator to temporarily release the fixture while repositioning him or herself for the drilling procedure. In the embodiment of FIG. 4, no bearing is provided between the abutment device 24 and the sleeve 18. Rather, the abutment device passes through an opening at the end of the sleeve with sufficient clearance to allow the abutment device to rotate relative to the sleeve. In the embodiment of FIG. 5, an external bearing 26 is provided to rotatably connect the abutment device 24 with the sleeve in a manner similar to that described above with reference to FIGS. 1-3.

Although the invention has been described with the threaded rod 16 fixed relative to the housing 4, the rod may also be rotatably connected with the housing within the threaded opening 14. This type of connection allows limited additional displacement of the rod relative to the housing, the displacement being limited by the depth of the housing opening 14. This limited displacement of the rod results in additional displacement of the sleeve to increase the distance over which the sleeve may be displaced.

The housing 4, rod 16 and sleeve 18 may be formed in different lengths to accommodate different spacing between the object being drilled and the stationary object opposite the drilled object. The fixture elements are preferably formed of a durable lightweight metal such as aluminum or may be formed of synthetic plastic material.

The drill fixture is particularly advantageous for drilling holes in confined areas. If used to drill holes in the frame of a vehicle, the drill may be positioned without removing the wheels of the vehicle or otherwise disassembling the vehicle. This decreases the time necessary to complete the drilling process.

Figure 6:
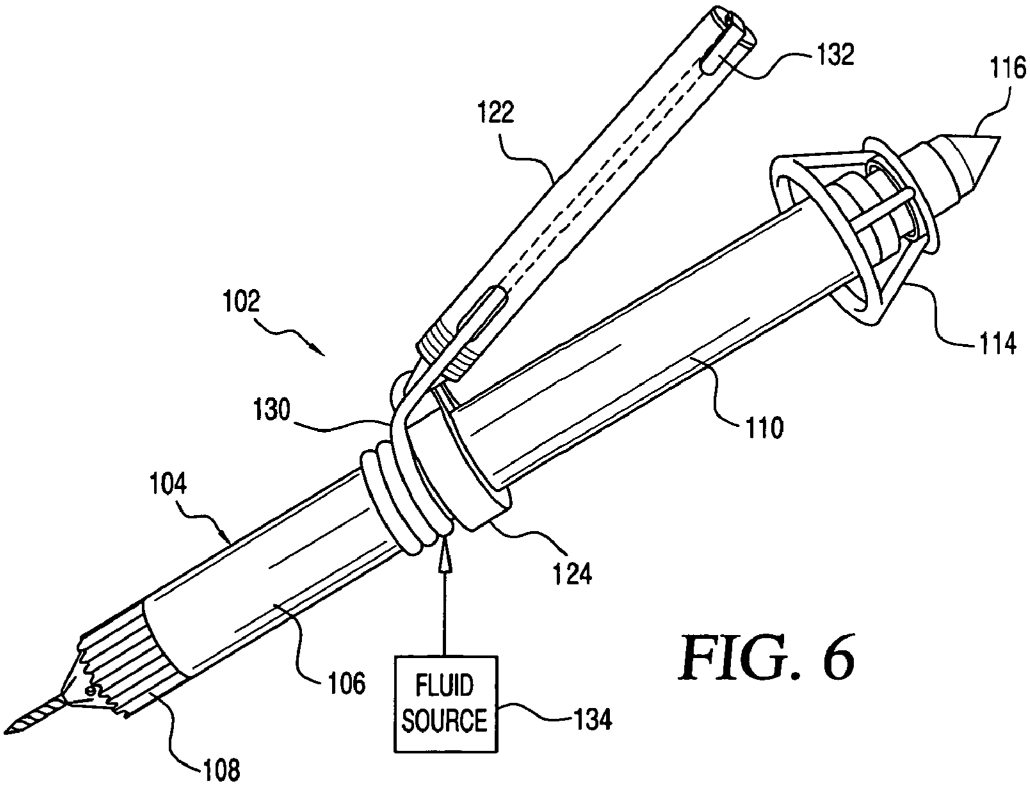
FIG. 6 is a perspective view of an alternate configuration of the drill fixture according to the invention.
Figure 7:
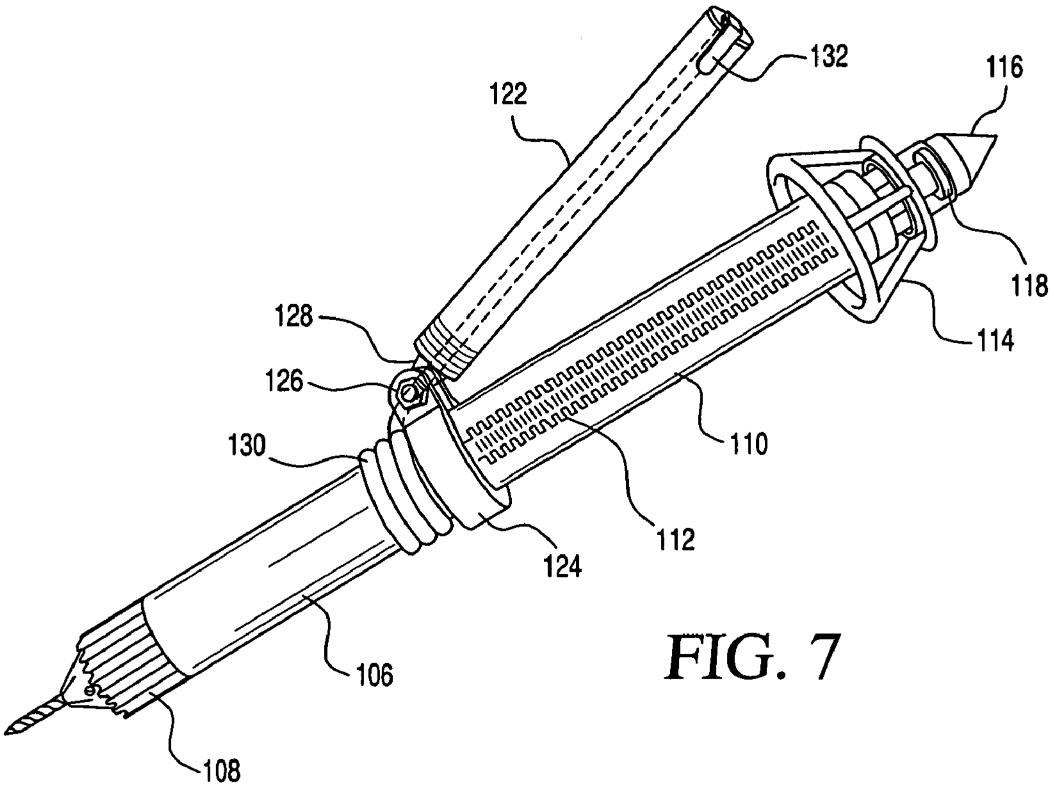
FIG. 7 is a partial sectional view of the fixture of FIG. 6.
Figure 8:
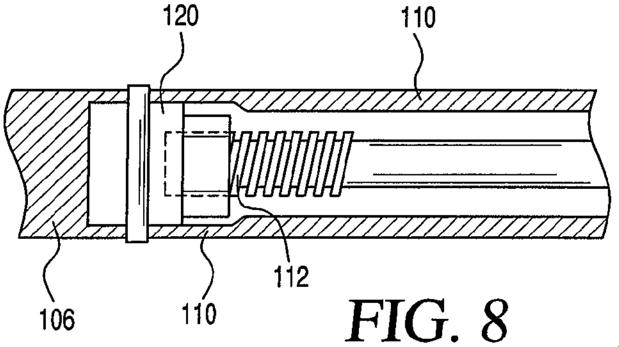
FIG. 8 is detailed sectional view of threaded rod of the fixture of FIG. 6.

Turning now to FIGS. 6-8, an alternate configuration of the drill fixture 102 will now be described. The housing 104 includes a forward portion 106 containing a chamber for receiving a drill 108. A rotatable cylindrical sleeve 110 is connected with the housing for movement along a threaded rod 112 upon rotation of the sleeve. A grip 114 is connected with the sleeve to facilitate its rotation by the user. An abutment device 116 having a pointed end is connected with the end of the sleeve 110 via a thrust bearing 118. As shown in FIG. 8, the forward portion 106 of the housing includes an internally threaded rod holder 120 which is connected with the housing via a roll pin. The threaded rod 112 is rotatably connected with the rod holder 120 for displacement relative to the holder and the housing. As in the embodiment of FIG. 1, rotation of the sleeve extends or retracts the abutment device so that the drill can be advanced into a surface to be drilled. The abutment device, the threaded rod, and the housing are co-axial so that the force applied to the drill bit is linear relative to the point of the abutment device.

Figure 9:
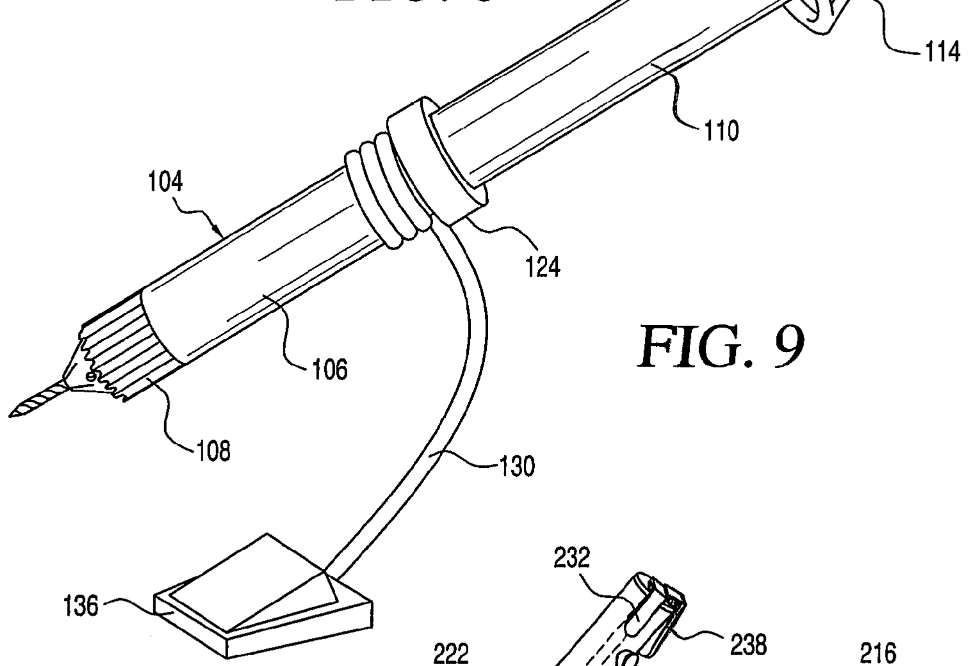
FIG. 9 is a perspective view of a further embodiment of a drill fixture according to the invention.

A major difference between the embodiments of FIGS. 6-8 and FIG. 1 is in the handle 122. A collar 124 is arranged on the outer surface of the housing and held in place by tightening a lock nut 126. Accordingly, the handle can be positioned longitudinally on the housing as well as oriented circumferentially before tightening the lock nut for positioning the drill fixture in a tight location. The handle is also pivotally connected with the collar via a hinged bracket 128 to adjust the angle between the handle and the housing. A pressure line 130 is connected between the trigger (not shown) of a drill and a lever 132 at the remote end of the handle. When the lever is operated by the user, pressure from a fluid source 134 is applied to the drill trigger to operate the drill. The fluid source may either be air or hydraulic. In lieu of a lever on the handle, a foot-operated switch 136 can be provided as shown in FIG. 9 to actuate the drill trigger. This allows the user to easily position the drill fixture and operate the drill in areas of limited access.

Figure 10:
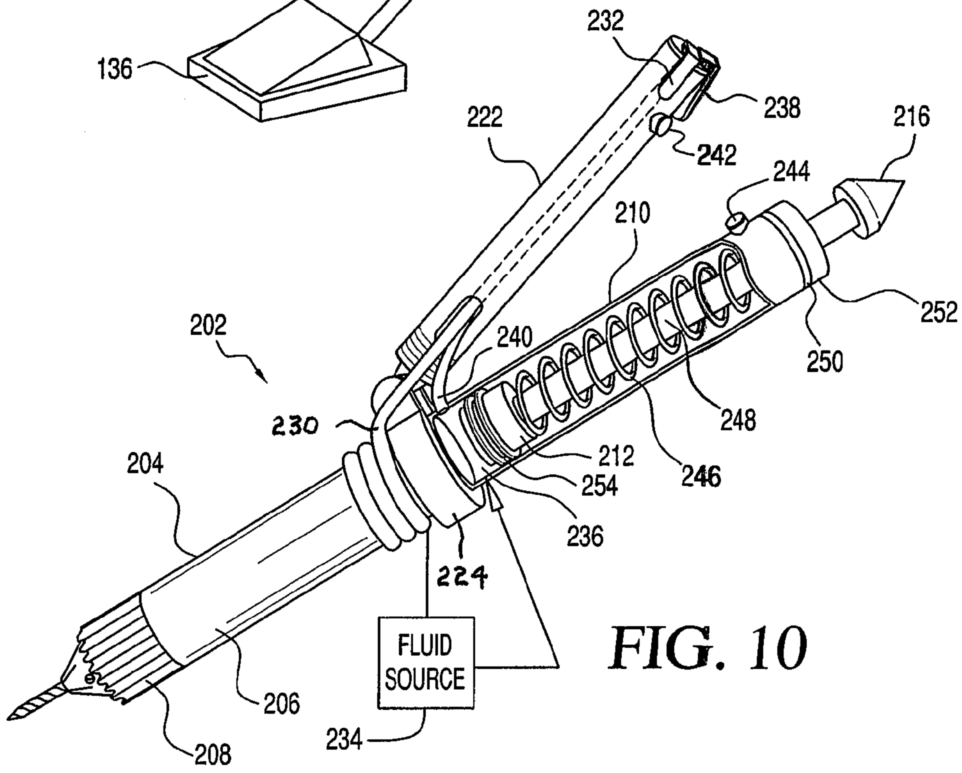
FIG. 10 is a sectional view of a pneumatic mechanism for operating the drill fixture according to a further embodiment of the invention.

FIG. 10 illustrates a further embodiment of the invention. In this embodiment, the threaded rod is replaced by a fluid piston to extend and retract the abutment member. More particularly, the drill fixture 202 comprises a housing 204 having a forward portion 206 for receiving a drill 208 and a rear cylindrical portion 210. A piston 212 is arranged within the cylindrical portion 210 and has a pointed abutment device 216 at the end thereof. A handle 222 is connected with the housing 204 via a collar 224. The handle includes a lever 232 for actuating the drill by providing pressure thereto via a pressure line 230. The fluid source 234 is also connected with a chamber 236 within the cylindrical sleeve behind the piston. A second lever 238 on the handle is operated by the user to control delivery of pressure to and from the chamber via a second pressure line 240. A first exhaust outlet 242 is provided in the handle to release pressure from the chamber 236 and a second exhaust outlet 244 is provided in the cylindrical sleeve to release pressure from within the sleeve forward of the piston. A spring 246 is provided around the piston shaft 248 to bias the piston to a retracted position and a seal 250 and end cap 252 are provided at the remote end of the cylindrical sleeve to render the sleeve fluid tight. In addition, O-rings 254 are provided about the piston.

In operation of the device of FIG. 10, pressure delivered to the chamber 236 extends the piston from the housing in a rearward direction. When the abutment device engages a rear surface, further extension of the piston provides a linear force to the drill bit to assist the bit in drilling and penetrating a surface to be drilled. When drilling is complete, the spring 246 biases the piston to its retracted position wherein the piston is withdrawn into the housing.

Figure 11:
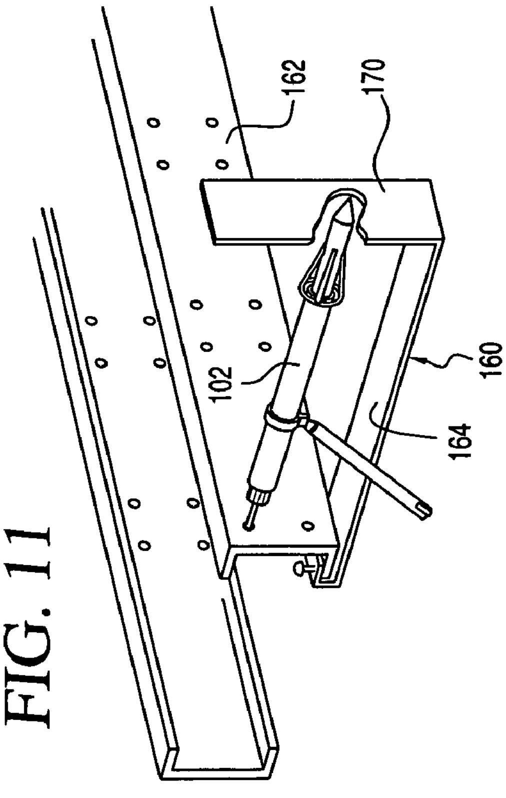
FIGS. 11 and 12 are a perspective view and a side plan view, respectively, of a mounting bracket connected with a vehicle frame according to the invention.
Figure 12:
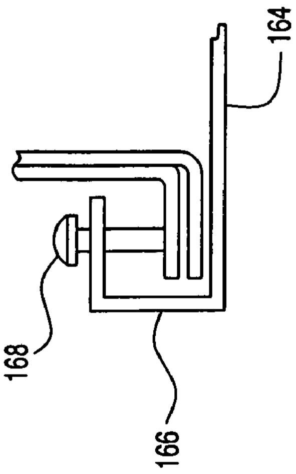

FIGS. 11 and 12 illustrate a mounting bracket 160 for use with the drill fixture 102 for drilling an exterior surface of a truck frame 162. The bracket has an L-shape. The horizontal portion 164 of the bracket includes a lip 166 extending adjacent a portion of the frame. A bolt 168 is used to connect the mounting bracket with the frame. The vertical portion 170 of the bracket provides a rear stationary surface for the abutment device of the fixture from which a drilling force is generated upon operation of the fixture as described above.

Figure 13:
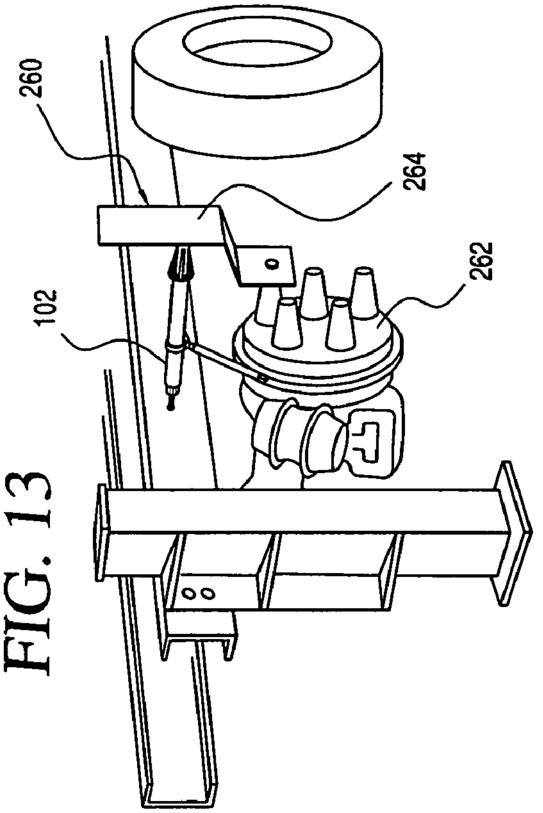
FIGS. 13 and 14 are a perspective view and a side plan view, respectively, of an alternate mounting bracket connected with a vehicle wheel hub according to the invention.
Figure 14:
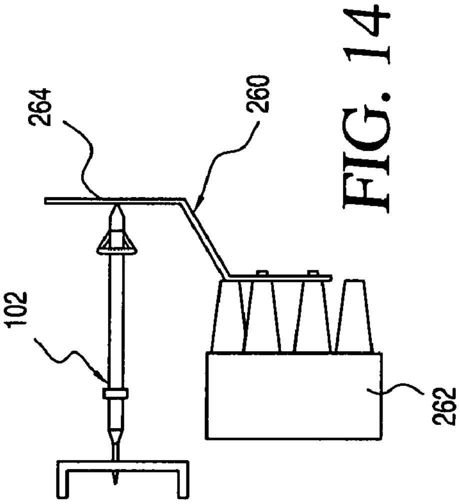

An alternate mounting bracket is shown in FIGS. 13 and 14. The mounting bracket 260 is adapted for mounting on the hub 262 of the wheel of a vehicle. The bracket is bolted to the lugs of the hub and a vertical portion 264 of the bracket provides the rear stationary surface for the abutment device of a drill fixture 102.

Of course, any of the different embodiments of the drill fixtures described herein may be used with the mounting brackets of FIGS. 11-14.

While the preferred forms and embodiments of the invention have been illustrated and described, it will be apparent to those of ordinary skill in the art that various changes and modifications may be made without deviating from the inventive concepts set forth above.

What is claimed is:

1. A fixture for supporting a drill, comprising (a) a housing for receiving a drill, said housing including a forwardly extending drill portion and a coaxial rearwardly extending cylindrical section open at the end thereof; (b) a rod having threads on an outer surface thereof connected with said housing and arranged coaxial with and extending from said housing cylindrical section open end; (c) a threaded cylindrical sleeve having a forward portion arranged within said housing cylindrical section and rotatably connected with said rod for displacement relative thereto, said sleeve and said housing completely enclosing said rod and said threads; and (d) an abutment member connected with a remote end of said cylindrical sleeve, whereby when the drill is positioned adjacent to a hard surface and said abutment member is positioned against a rear surface opposite the hard surface, said cylindrical sleeve may be rotated relative to said rod and extended from said housing cylindrical section while the drill is operated to provide a longitudinal drilling force along the axis of said housing.

2. A fixture as defined in claim 1, wherein said abutment member includes an abutment device rotatably connected therewith for abutting against the rear surface.

3. A fixture as defined in claim 2, wherein said abutment device terminates in a rearwardly facing point.

4. A fixture as defined in claim 2, and further comprising a bearing connecting said abutment device with said sleeve rear portion.

5. A fixture as defined in claim 2, and further comprising a spring arranged between said rod and said abutment device to bias said abutment device against the rear surface.

6. A fixture as defined in claim 1, wherein said rod is threadably connected with said housing for displacement relative to said housing, whereby the effective length of displacement of said sleeve is increased.

7. A fixture as defined in claim 1, and further comprising a handle portion including a remote drill actuator at an end portion thereof.

8. A fixture as defined in claim 1, and further comprising a remote foot-operated drill actuator connected with said housing.

9. A fixture as defined in claim 1, wherein the rear surface is provided on a mounting bracket for said fixture.

10. A fixture for supporting a drill used to drill a hole in the frame of a vehicle, comprising (a) a mounting bracket connected with the vehicle and having a surface parallel to and opposite a surface of the vehicle frame to be drilled;

(b) a housing receiving a drill, said housing including a forwardly extending drill portion which engages the vehicle frame surface and a coaxial rearwardly extending cylindrical section open at the end thereof;

(c) a rod having threads on an outer surface thereof connected with said housing and arranged coaxial with and extending from said housing cylindrical section open end for engaging the surface of said mounting bracket;

(d) a threaded cylindrical sleeve having a forward portion arranged within said housing cylindrical section and rotatably connected with said rod for displacement relative thereto, said sleeve and said housing completely enclosing said rod and said threads; and (e) an abutment member connected with a remote end of said cylindrical sleeve, whereby when the drill is positioned against the vehicle frame surface and said abutment member is positioned against said mounting bracket surface, said cylindrical sleeve may be rotated relative to said rod and extended from said housing cylindrical section while the drill is operated to provide a longitudinal drilling force along the axis of said housing to advance the a bit of the drill against and through the vehicle frame surface.

11. A drill fixture as defined in claim 10, wherein said mounting bracket is connected with the vehicle frame.

12. A drill fixture as defined in claim 10, wherein said mounting bracket is connected with a wheel hub of the vehicle.

* * * * *